United States Patent [19]

Igaki et al.

[11] Patent Number: 5,302,821
[45] Date of Patent: Apr. 12, 1994

[54] ENCODER USING A BIREFRINGENT ELEMENT AND A SYSTEM INCLUDING THE SAME

[75] Inventors: Masahiko Igaki, Tokyo; Koh Ishizuka, Urawa; Masaru Nyui, Tokyo, all of Japan

[73] Assignee: Canon Kabushiki Kaisha, Tokyo, Japan

[21] Appl. No.: 903,522

[22] Filed: Jun. 24, 1992

[30] Foreign Application Priority Data

Jul. 29, 1991 [JP] Japan .................................. 3-188666

[51] Int. Cl.⁵ .......................... G01D 5/34; H01J 3/14
[52] U.S. Cl. ......................... 250/237 G; 250/231.16
[58] Field of Search .............. 250/231.16, 237 G, 561; 356/373-375, 368; 341/13

[56] References Cited

U.S. PATENT DOCUMENTS

| | | | |
|---|---|---|---|
| 3,584,959 | 6/1971 | Del Carlo | 356/368 |
| 4,034,403 | 7/1977 | Compaan et al. | 250/237 G |
| 4,930,895 | 6/1990 | Nishimura et al. | 356/356 |
| 4,933,673 | 6/1990 | Ishizuka et al. | 341/13 |
| 4,975,570 | 12/1990 | Nishimura et al. | 250/231.16 |
| 4,979,826 | 12/1990 | Ishisuka et al. | 356/356 |
| 5,026,985 | 6/1991 | Ishizuka et al. | 250/231.16 |

FOREIGN PATENT DOCUMENTS

0345093 12/1989 European Pat. Off. .
2615281 11/1988 France .

Primary Examiner—David C. Nelms
Assistant Examiner—Stephone B. Allen
Attorney, Agent, or Firm—Fitzpatrick, Cella, Harper & Scinto

[57] ABSTRACT

An encoder includes a light illuminating device, an optical scale and a photosensor, and detects information of relative displacement between the scale and the illuminating light. A birefringent element, such as a Savart plate or the like, is disposed in the optical path between the light illuminating device and the photosensor to generate a plurality of images of the scale having different phases. A plurality of output signals having a phase difference are obtained using the images of the scale.

16 Claims, 9 Drawing Sheets

ENCODER USING A BIREFRINGENT ELEMENT AND A SYSTEM INCLUDING THE SAME

BACKGROUND OF THE INVENTION

1. Field of the Invention

This invention relates to the technical field of optical measurement for optically measuring, for example, displacement information of an object.

2. Description of the Prior Art

Figure 9:
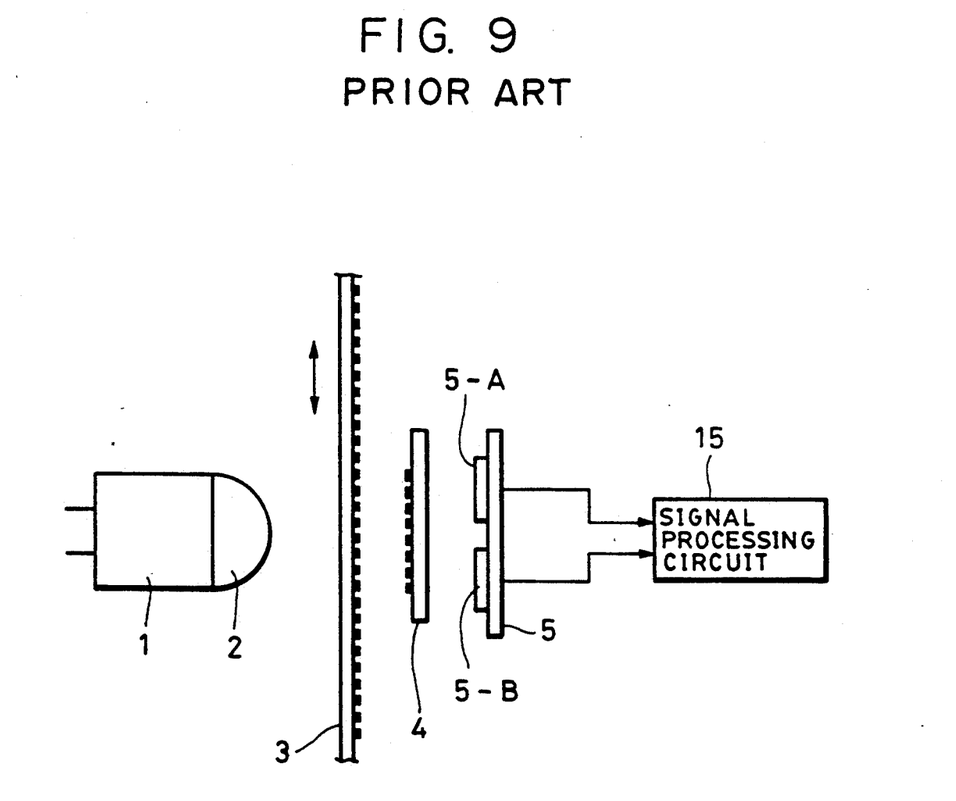
FIG. 9 is a diagram showing an example of the configuration of a conventional optical encoder.

A conventional optical encoder is configured, for example, as shown in FIG. 9. In FIG. 9, there are shown a light source 1, such as an LED (light-emitting diode) or the like, a lens 2, a moving scale 3, a fixed scale 4, and a photodetector 5 comprising detector elements 5-A and 5-B. The interval between the detector elements 5-A and 5-B is set so that periodic signals having a phase difference (in general, 90 degrees) are output from these elements in order to increase resolution by determining the direction of the movement of the moving scale 3 or performing signal interpolation. Such signal processing is performed by a signal processing circuit 15.

Accuracy in the phase difference need not be high for the purpose of determining the direction. However, if the signals are used for the purpose of increasing resolution, accuracy in the phase difference is important, since the accuracy relates to final accuracy in position detection. In conventional methods, the accuracy depends on accuracy in the assemblage of the encoder. Hence, much time is needed for the adjustment of the encoder, causing an increase in the production cost of the encoder.

SUMMARY OF THE INVENTION

The present invention has been made in order to solve the problems in the prior art, and can be applied to various types of optical encoders.

It is an object of the present invention to provide an encoder which uses a novel method, and which can be easily adjusted with a simple configuration and obtain highly precise phase-difference signals.

This object is accomplished, according to one aspect of the present invention, by an encoder comprising a moving optical scale, a light source for generating light for illuminating the optical scale, a birefringent element placed in an optical path of the light generated by the light source, and photosensing means for obtaining a plurality of output signals having a phase difference, whose intensities change in accordance with a relative displacement of the scale with respect to the illuminating light, from light passing through the birefringent element.

The forgoing and other objects, advantages and features of the present invention will become more apparent from the following description of the preferred embodiments taken in connection with the accompanying drawings.

DESCRIPTION OF THE PREFERRED EMBODIMENTS

Embodiments of the present invention will now be explained in detail with reference to the drawings.

Figure 3:
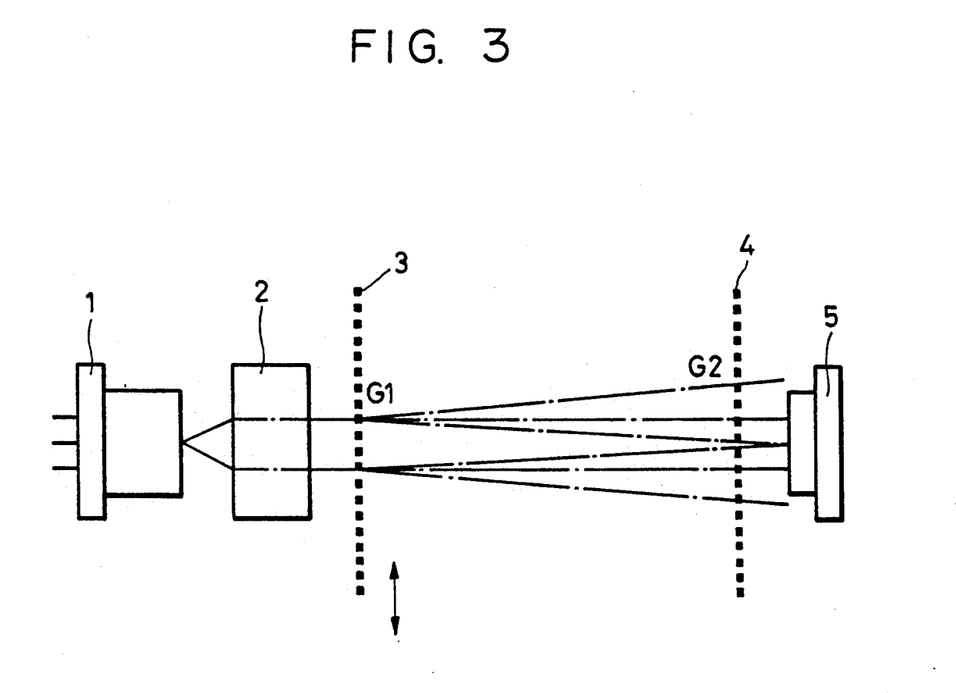
FIG. 3 is a diagram illustrating the basic principle of a Talbot encoder.

In a first embodiment of the present invention, the invention is applied to an optical encoder which uses Fourier images, a so-called Talbot encoder. First, the general configuration of an optical encoder which uses Fourier images will be briefly explained. FIG. 3 is a cross-sectional view of an optical system for the purpose of explaining the operation of such an optical encoder. In FIG. 3, a semiconductor laser 1 emits a coherent light beam having a wavelength λ. A lens system 2 comprises a collimating lens for converting the light beam from the semiconductor laser 1 into a parallel light beam. A light illuminating means is configured by the semiconductor laser 1 and the lens system 2. A moving optical scale 3 comprises a slit-like diffraction grating (having a pitch P) formed by depositing a chromium film on a glass plate in a vacuum and subsequently etching the deposited film. A fixed optical scale (index scale) 4 comprises a grating having the same pitch P formed in the same manner as the scale 3. The scale 3 is either a linear scale in which the grating is linearly formed along the direction of the movement, or a rotary scale in which the grating is formed along a circumference, and is displaced in the directions of the two-headed arrow. A photodetector 5 detects the amount of light. The output of the photodetector 5 is connected to a signal processing circuit (not shown) for measuring displacement information, such as the amount of displacement, the speed of displacement and the like.

An explanation will now be provided of the function of the optical system which has the above-described configuration. The light beam from the semiconductor laser 1 is converted into a parallel beam by the lens system 2. The parallel beam is incident upon the grating G1 of the scale 3. The light beam is defracted by the grating G1 to produce diffracted light of the 0-order, ±1st-order, ±2nd-order, .... As a result of inteference between two or three light beams, mainly the 0-order and ±1st-order light beams, a Fourier image of the grating G1 is imaged on the surface of the grating of the scale 4. The Fourier image is repeatedly imaged behind the surface of the grating at positions L corresponding to integer multiples of a certain distance expressed by the following expression:

$$L = N \times P^2/\lambda \quad (N = 1, 2, 3, \ldots).$$

For example, the wavelength λ of the light source, the pitch P of the grating, the position of the collimating lens system 2 and the index scale 4 are arranged so that the 3rd (N=3) Fourier image is imaged onto the grating surface of of the scale 4. The light-and-dark pitch of the Fourier image equals the pitch P of the grating of the scale 3. By the movement of the scale 3, phase shift of each diffracted light is produced. As a result, the Fourier image on the surface of the grating of the scale 4, which is an interference image, moves in the same direction as the direction of movement of the scale 3. By detecting a change in light intensity produced as a result of superposition of the Fourier image, moving in accordance with the movement of the scale 3, and the index scale 4 by the photodetector 5, the amount of displacement and the speed of displacement can be obtained.

Next, an explanation will be provided of the first embodiment which is based on the encoder having the above-described configuration.

Figure 1:
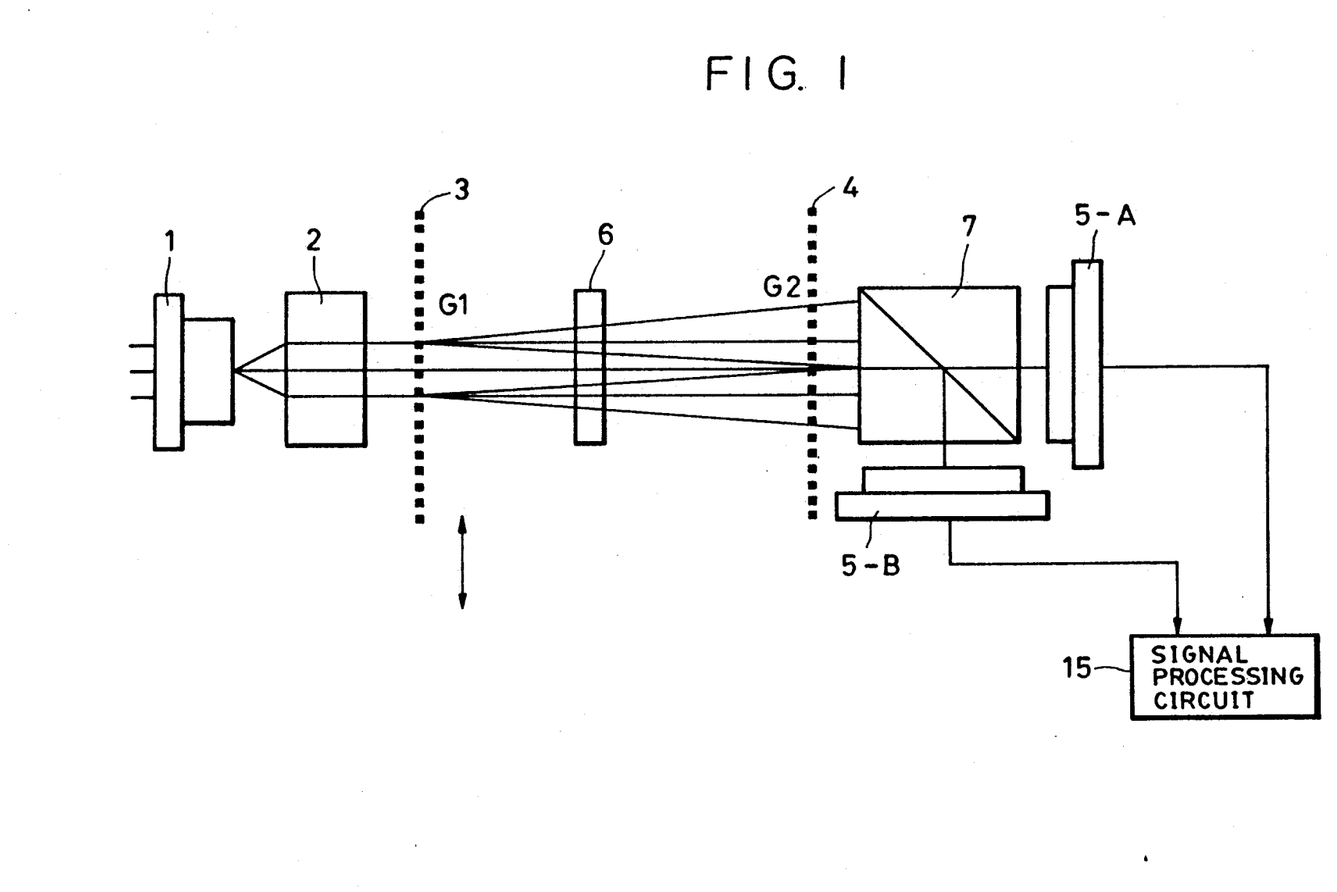
FIG. 1 is a cross-sectional view of an optical system according to a first embodiment of the present invention.
Figure 2:
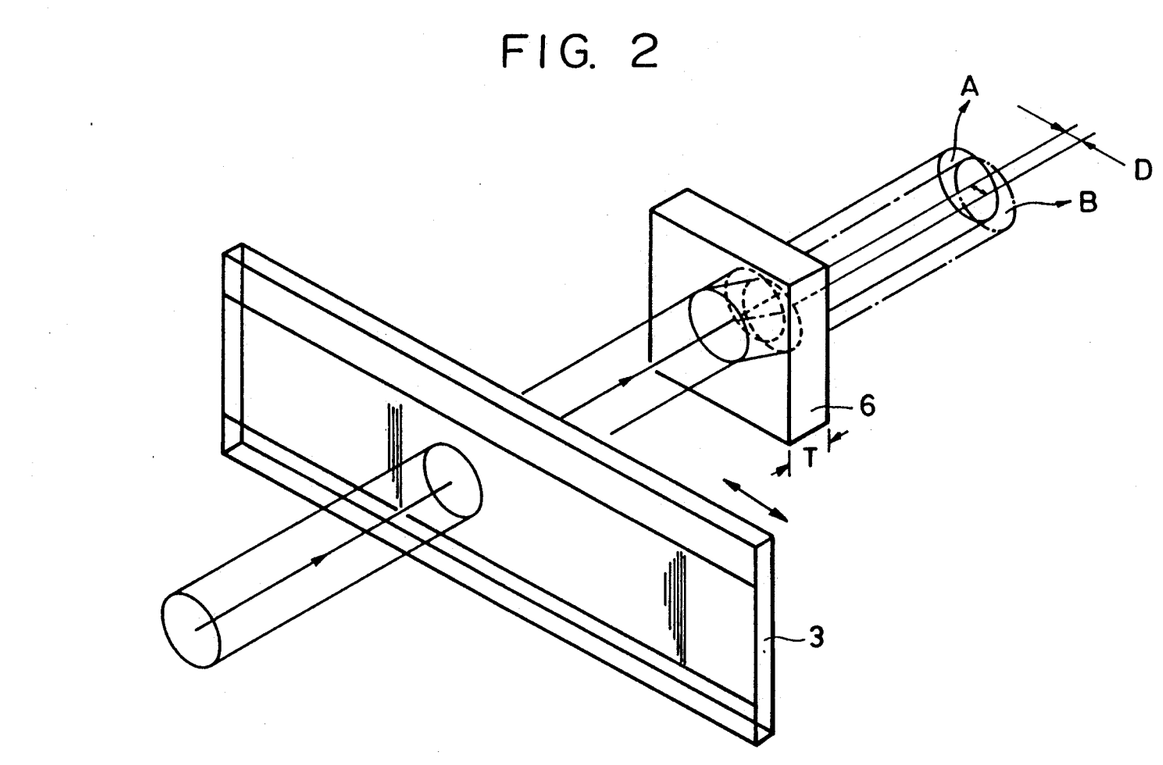
FIG. 2 is a perspective view of a principal part of the optical system of the first embodiment.

FIG. 1 is a cross-sectional view of the optical system of the encoder of the first embodiment. Each of the elements shown in block outline in FIG. 1, as well as in FIGS. 4–9, is well known per se, and the specific type of construction is not critical to carrying out the invention or to a disclosure of the best mode for carrying out the invention. FIG. 2 is a perspective view of a principal part of the optical system shown in FIG. 1. In FIGS. 1 and 2, components indicated by reference numerals 1–4 are the same as those shown in FIG. 3. Although a linear scale is used as the moving scale 3 as shown in FIG. 2, a rotary scale in which the grating is formed along the circumferential direction of a rotating plate may be used. A principal part newly added to the configuration shown in FIG. 3 will be explained. A birefringent element 6 comprises a synthesized-quartz Savart plate having a thickness T made of birefringent quartz crystals. The direction of the crystal's optical axis of the Savart plate 6 is set so that the direction of the image shift of the extraordinary ray relative to the ordinary ray is orthogonal to the longitudinal direction (or the direction of the movement of the scale 3) of the grating of the scale 3. The direction of the image shift is shown in FIG. 2.

There are also shown a polarizing beam splitter 7, serving as a polarized-light separation means, and photodetectors 5-A and 5-B. The configuration comprising these units separates a light beam according to the orientation of polarization, and individually detects the intensity of each light beam. The semiconductor laser 1, serving as the light source, is mounted so that the azimuth of the oscillation of linearly polarized light is inclined by 45 degrees with respect to the longitudinal direction (or the direction of the movement of the scale 3) of the opening of the slit of the optical scale 3. Hence, the direction of polarization of the linearly polarized laser light is also inclined by 45 degrees with respect to the optical axis of the crystals of the Savart plate 6. A signal processing circuit 15 includes a pulse counting circuit, a signal interpolating circuit, a direction determining circuit and the like. The signal processing circuit 15 detects the highly precise amount and speed of displacement obtained by signal interpolation, and determines the direction of displacement.

The function of the encoder of the embodiment having the above-described configuration will now be explained. The light beam from the semiconductor laser 1 is converted into a parallel light beam by the lens system 2. The semiconductor laser 1 is mounted so that the direction of polarization of the light beam is inclined by 45 degrees with respect to the direction of the slits of the scale 3. The parallel light beam is incident upon the grating G1 of the scale 3. The light beam is diffracted by the grating G1 to produce a plurality of diffracted light beams of 0-order, ±1st-order, ±2nd-order, . . . . As a result of interference between two or three light beams, mainly the 0-order and ±1st-order light beams, the Fourier image of the grating of the scale 3 is repeatedly imaged behind the surface of the grating at positions L corresponding to integer multiples of a certain distance.

Next, the function of the Savart plate 6 will be explained. The linearly-polarized laser light vertically incident upon the Savart plate having a thickness T leaves the Savart plate by being divided into two parallel light beams (an ordinary ray and an extraordinary ray) separated by a distance D and having different orientations of polarization. By projecting the linearly-polarized light in a state inclined by 45 degrees with respect to the optical axis of the crystals of the Savart plate, the amounts of the outgoing ordinary ray and extraordinary ray can be equal. The relationship between the thickness T and the distance D is expressed by the following expression:

$$D = T \times (n_e^2 - n_0^2)/(n_e^2 n_0^2),$$

where D is the width of birefringence, $n_0$ is the refractive index of the ordinary ray, T is the thickness of the quartz Savart plate, and $n_e$ is the refractive index of the extraordinary ray.

As shown in FIG. 2, when the above-described diffracted light beams (0-order light, +1st-order light and −1st-order light) are incident upon the Savart plate 6, the diffracted light beams produce a Fourier image A made by the ordinary ray and a Fourier image B made by the extraordinary ray. While the Fourier image A by the ordinary ray is imaged in the same manner as when a light beam passes through typical isotropic optical glass, the Fourier image B by the extraordinary ray is deviated in the direction orthogonal to the travelling direction of light and orthogonal to the longitudinal direction of the slit 3. The amount of deviation between the two Fourier images equals the value D expressed by the above-described expression.

For example, if the amount of deviation between the images is set to ¼ (corresponding to a phase difference of 90 degrees) of the pitch P of the scale, from the values of the refractive index $n_0$ of the synthesized quartz of 1.53903 (λ=768 nm) for the ordinary ray and the refractive index $n_e$ of 1.54794 (λ=768 nm) for the extraordinary ray, the following expression holds:

$$T = 173.232 \times D$$
$$= 173.232/4 \times P,$$

and a double image as shown in FIG. 2 is formed.

Accuracy in the deviation of the images will be calculated. If it is assumed that P=10 μm and the width of the deviation between the images is P/4 (D=2.5 μm), the thickness T of the synthesized quartz Savart plate becomes 0.433 mm. If an error of thickness of 0.005 mm is allowed as an error of processing of a synthesized-quartz Savart plate, accuracy in the deviation of the images is within a range of a phase error of about 1 percent.

The Fourier image A by the ordinary ray and the Fourier image B by the extraordinary ray are superposed at the surface of the grating of the scale 4 to form respective fringes. The spatial phases of the fringes by the ordinary ray and the fringes by the extraordinary ray are shifted by an amount corresponding to a ¼ period. The respective fringes comprise the components of P-polarized light and S-polarized light having a difference of 90 degrees in the orientation of polarization. Accordingly, a change in the light intensity of these fringes can be detected by separating the components by the polarizing beam splitter.

As described above, by separating light transmitted through the first grating into a first Fourier image made by an ordinary ray and a second Fourier image made by an extraordinary ray by the birefringent element to shift the images, forming fringes having different orientations of polarization by the second grating, and detecting a change in light intensity by a detector by separating respective components by the polarized-light detection means, two signals whose phases are shifted can be obtained. Although, in the present embodiment, the amount of phase shift is assumed to be 90 degrees, the amount of phase shift is not limited to this value. Furthermore, by providing an aperture common to an ordinary-ray beam and an extraordinary-ray beam between the scale 4 and the polarized-light separation means, it is possible to obtain signals having a phase difference more exactly.

Figure 4:
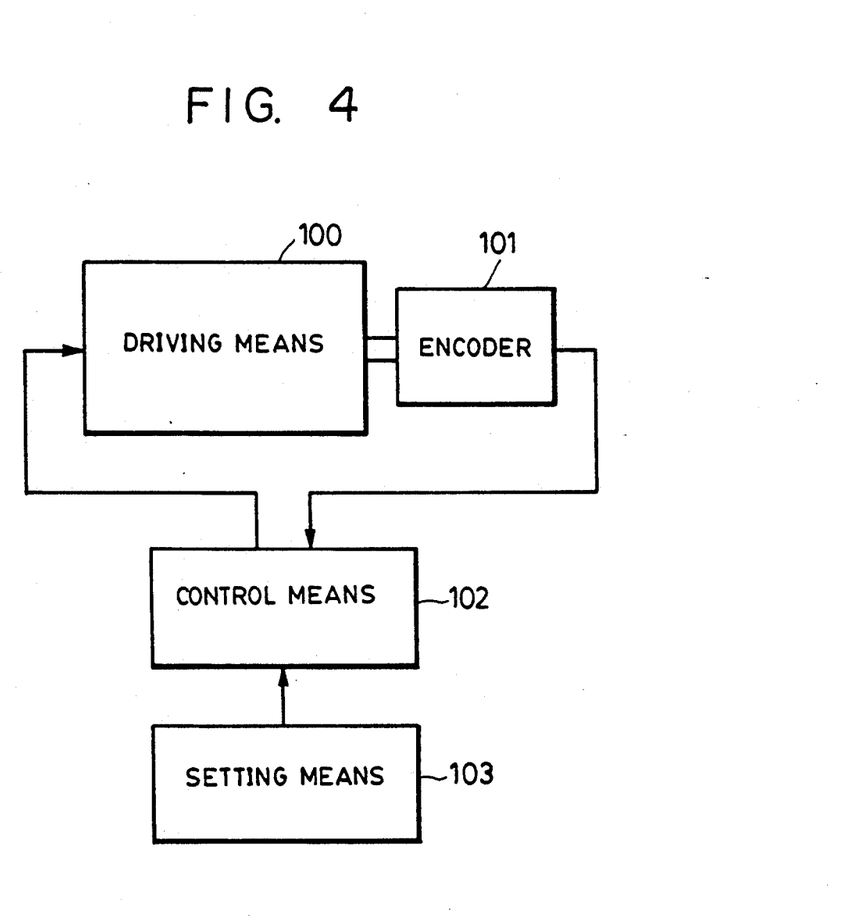
FIG. 4 is a diagram showing the configuration of a driving system which uses an encoder.

FIG. 4 shows an example of the use of the above-described encoder, and is a digram of the configuration of a driving system which uses the encoder. An encoder 101 is connected to a driving output unit of a driving means 100 including a driving source, such as a motor, an actuator, an internal combustion engine or the like, or a moving portion of a driven object. The encoder 101 includes a pulse-counting circuit, a signal interpolation circuit, a direction-determining circuit and the like, and very precisely detects the amount and speed of displacement, and the direction of displacement. The detection output of the encoder 101 is fed back to a control means 102, which transmits a driving signal to the driving means 100 so as to provide a state set by a setting means 103. By providing such a feedback system, a driving state set by the setting means 103 can be obtained. Such a driving system can be widely applied, for example, to business machines, such as typewriters, printers, copying machines, facsimiles and the like, image apparatuses, such as cameras, video apparatuses and the like, information recording/reproducing apparatuses, robots, machine tools, manufacturing apparatuses, automobiles, and any other apparatuses provided with driving means.

SECOND EMBODIMENT

Figure 5:
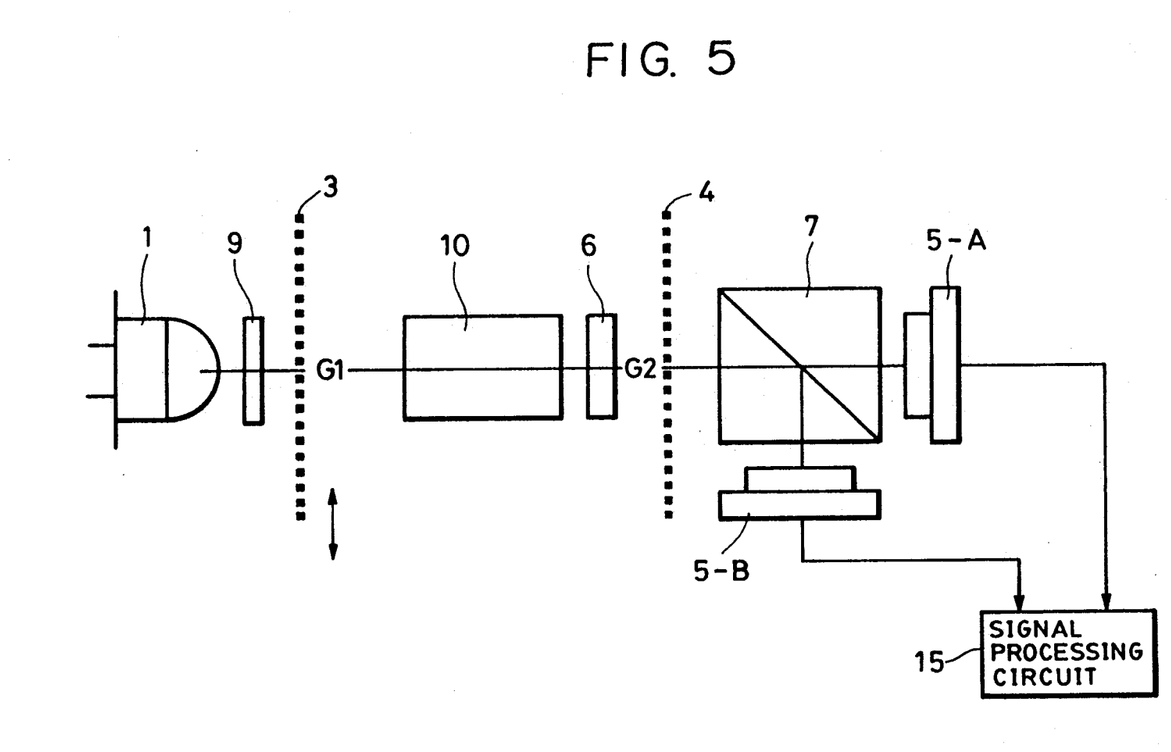
FIG. 5 is a cross-sectional view of an optical system according to a second embodiment of the present invention.

A second embodiment of the present invention will now be explained. FIG. 5 shows the configuration of the second embodiment, and shows a encoder which uses an LED (light-emitting diode) as a light illuminating means, and includes an imaging lens system. In FIG. 5, there are shown an LED 1, serving as a light source, optical scales 3 and 4 which have the same configuration as in the first embodiment, an imaging lens 10 for imaging an image of the grating of the scale 3 on the surface of the grating of the scale 4, and a synthesized-quartz Savart plate 6, serving as a birefringent element. Since light emitted from the LED 1 is randomly poralized and is not polarized in a particular direction, the polarizing plate 9 is disposed in the optical path immediately after the light source 1 so that the light beam from the light source 1 is linearly-polarized. The direction of the polarizing plate 9 is set so that the orientation of the linearly-poralized light is the same as in the first embodiment. Since the function of obtaining signals having a phase difference is the same as in the first embodiment, a detailed explanation thereof will be omitted.

THIRD EMBODIMENT

Figure 6:
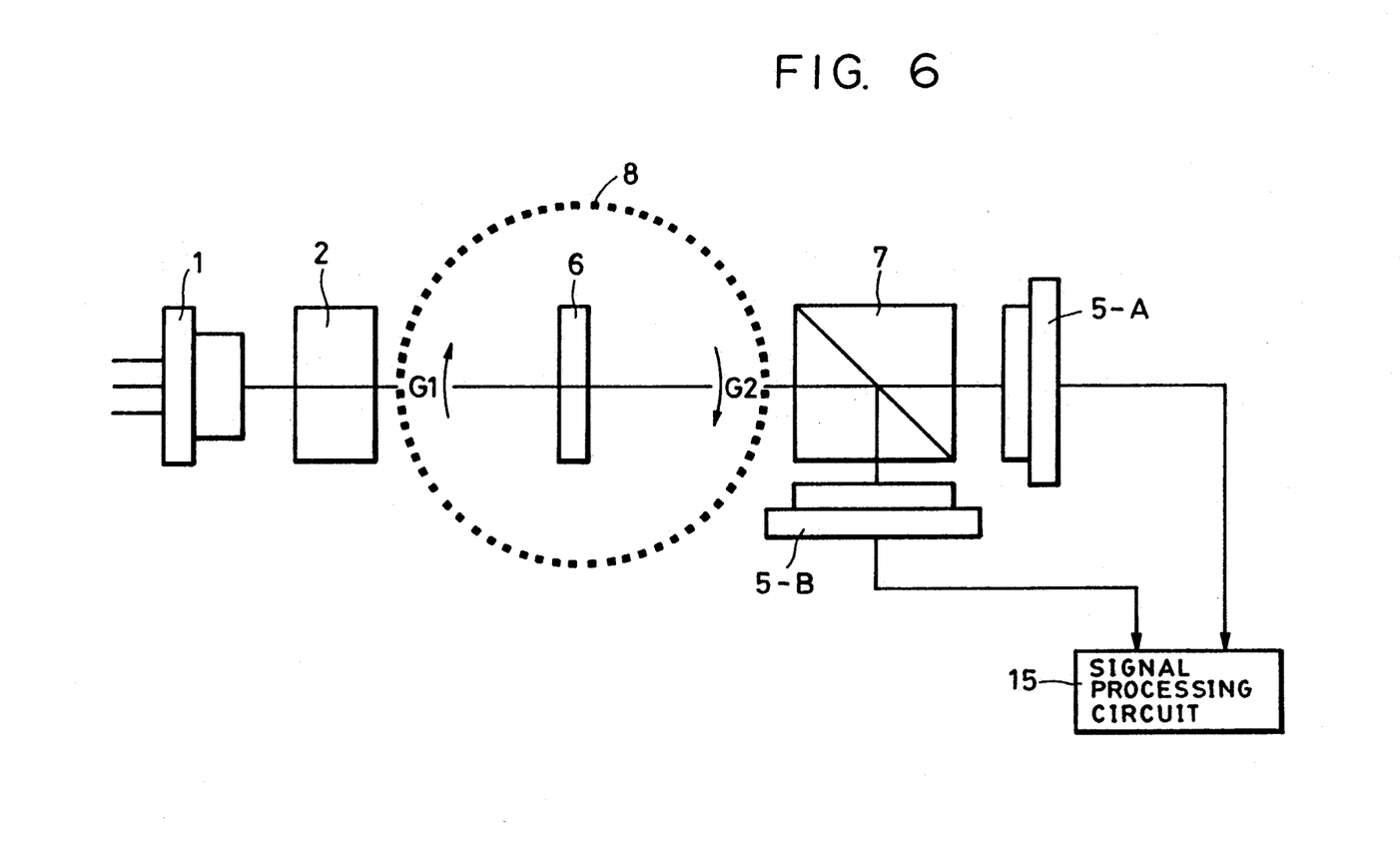
FIG. 6 is a cross-sectional view of an optical system according to a third embodiment of the present invention.

FIG. 6 is a diagram illustrating a third embodiment of the present invention, wherein the invention is applied to an optical rotary encoder which uses a cylindrical grating comprising diffraction-grating slits formed on a side of a cylindrical scale. According to this configuration, grating portions G1 and G2 are parts of the same cylindrical grating. If grating portions G1 move relative to the light source 1 in the direction of the arrow, grating portions G2 move in the reverse direction. Since the Fourier image of the grating portions G1 move in the direction reverse to the direction of the movement of the grating portions G2 in accordance with the movement of the scale, the period of lightness and darkness made by the superposition of the Fourier images by the grating portions G1 and G2 is twice the period of the movement of the pitch of the grating. That is, an encoder whose resolution is doubled can be obtained.

FOURTH EMBODIMENT

Figure 7:
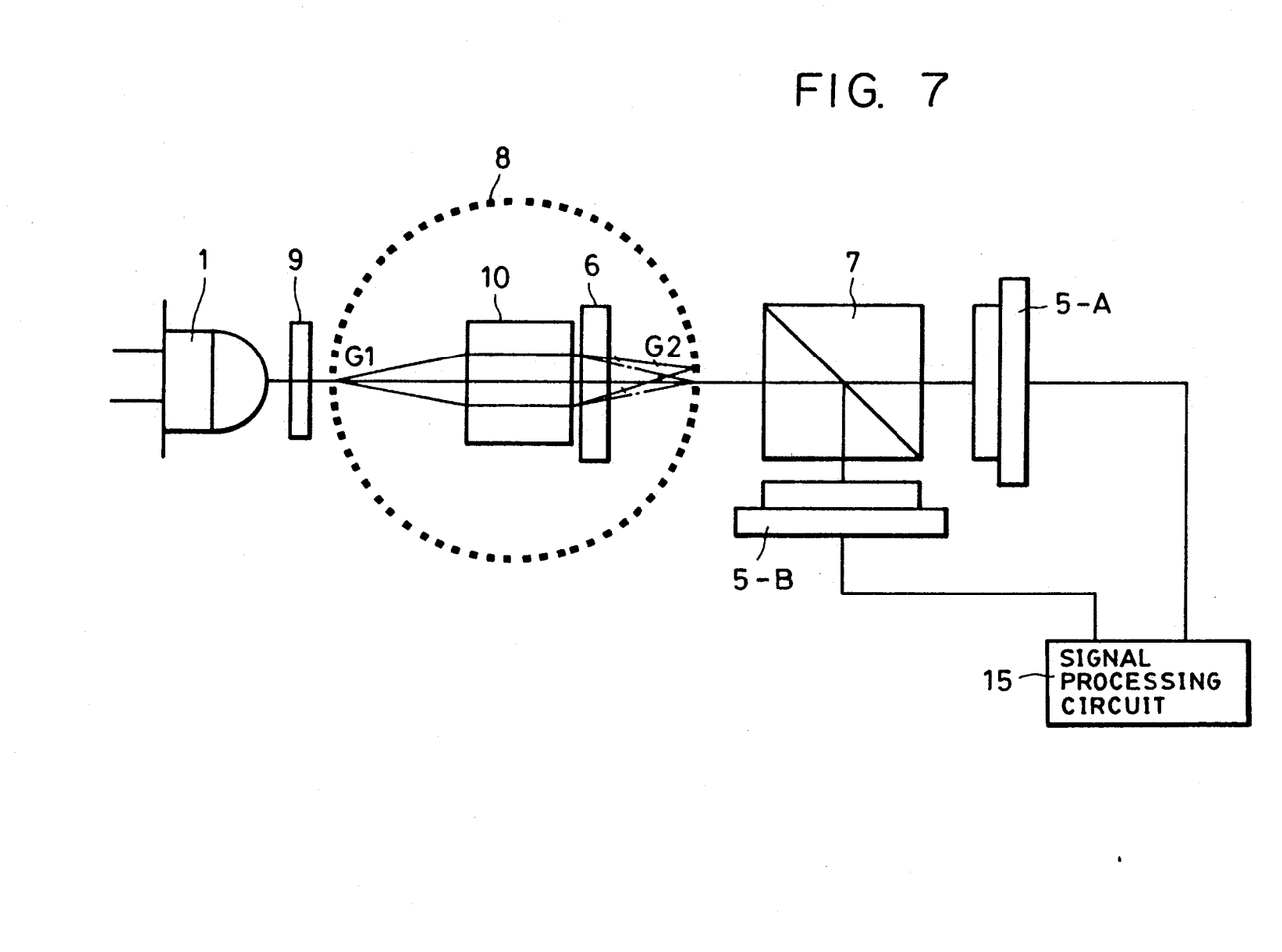
FIG. 7 is a cross-sectional view of an optical system according to a fourth embodiment of the present invention.

FIG. 7 is a diagram illustrating a fourth embodiment of the present invention, in which the invention is applied to a rotary encoder configured by a cylindrical grating and an imaging lens. The imaging-lens system uses an LED as a light illuminating means. In FIG. 7, there are shown an LED 1, serving as a light source, an optical scale 8 having the same configuration as in the third embodiment, an imaging lens for forming an erect image of unit magnification of the grating of the scale 8 on the surface of the grating of the scale 8, and a synthesized-quartz Savart plate 6, serving as a birefringent element. Since the light emitted from the LED 1 is randomly poralized and is not polarized in a particular direction, a polarizing plate 9 is disposed in the optical path immediately after the light source 1 so that the light beam from the light source 1 is linearly-polarized. The direction of the polarizing plate 9 is set so that the orientation of the linearly-polarized light is the same as in the first embodiment. Since the function of obtaining signals having a phase difference is the same as in the second and third embodiments, a detailed explanation thereof will be omitted.

FIFTH EMBODIMENT

Figure 8:
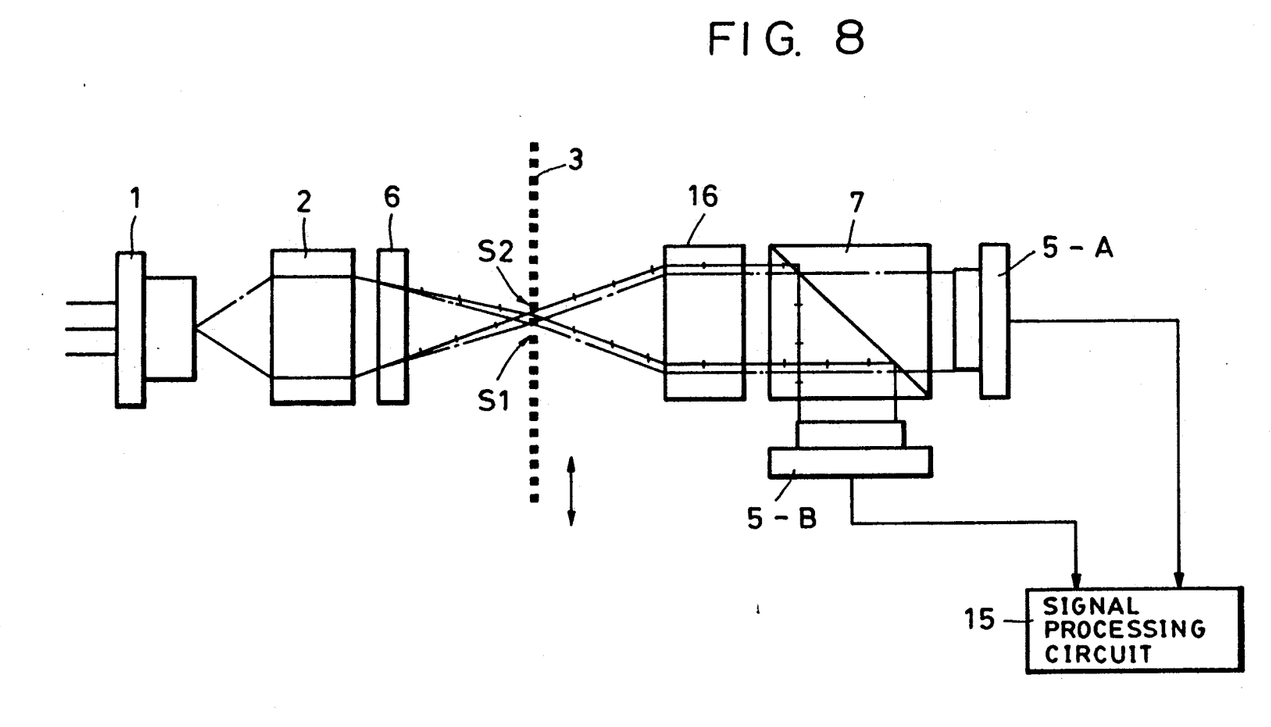
FIG. 8 is a cross-sectional view of an optical system according to a fifth embodiment of the present invention.

FIG. 8 is a diagram illustrating a fifth embodiment of the present invention, wherein the invention is applied to an optical rotary encoder in which a light beam is focused by a light illuminating means and a connector lens and a scale is arranged on the focus position. Either a linear-type encoder or a rotary-type encoder may be used. In FIG. 8, there are shown a synthesized-quartz Savart plate 6, a lens 16 for efficiently guiding the light beam to photodetectors 5-A and 5-B. In the present embodiment, a lens 2 is disposed so that the light beam is focused on the surface of the grating of an optical scale 3. A focus S1 of an ordinary ray and a focus S2 of an extraordinary ray are formed while being shifted by the amount D of image shift determined by the thickness of the synthesized-quartz Savart plate 6. By setting the amount D of image shift to ¼ of the pitch P of the grating of the optical scale 3, signals having a phase difference of 90 degrees can be obtained.

Although, in the above-described embodiments, linearly-polarized light is used as illuminating light, a circularly-polarized light may be used. If circularly-polarized light is incident upon a Savart plate, an ordinary ray and an extraordinary ray which are linearly polarized and whose orientation of polarization are different by 90 degrees come out. Hence, the equivalent functions and effects can be obtained by the same configuration as in the above-described embodiments. Any other element than a quartz Savart plate, such as a Wollaston prism or the like, may be used as a birefringent element having a birefringent function.

As described above, according to the present invention, it is possible to provide an optical encoder having a simple configuration which can detect highly precise phase-difference signals which do not depend upon accuracy in an assembling operation.

What is claimed is:

1. An encoder, comprising:
    a moving optical scale;
    a light source for generating light for illuminating said optical scale;
    a birefringent element placed in an optical path of the light generated by said light source for receiving light emitted from said optical scale; and
    photosensing means for obtaining a plurality of output signals having a phase difference from light passing through said birefringent element, with the output signals having intensities which change in accordance with relative displacement of said moving optical scale with respect to the illuminating light.

2. An encoder according to claim 1, wherein said birefringent element comprises a Savart plate.

3. An encoder according to claim 1, wherein said photosensing means includes polarized-light separation means for splitting the light generated by said light source.

4. An encoder according to claim 3, wherein said photosensing means includes a plurality of photosensors for sensing light beams separated by said polarized-light separation means.

5. An encoder according to claim 1, wherein said light source comprises a semiconductor laser.

6. An encoder according to claim 1, further comprising signal processing means for performing either one or both of signal interpolation and determination of the direction of displacement according to a plurality of output signals having a phase difference obtained by said photosensing means.

7. An encoder according to claim 1, whereins said moving optical scale comprises a linear scale.

8. An encoder according to claim 1, wherein said moving optical scale comprises a rotary scale.

9. An encoder according to claim 1, wherein said moving optical scale comprises a cylindrical scale.

10. An encoder according to claim 1, wherein said moving optical scale functions as a diffraction grating.

11. An encoder according to claim 9, wherein a displacement of said moving optical scale is detected by projecting a Fourier image of said moving optical scale onto a fixed optical scale.

12. A driving system including an encoder, said system comprising:
    driving means for driving an object;
    an encoder for detecting a driving state of said driving means; and
    control means for controlling said driving means according to an output of said encoder, wherein said encoder comprises:
    a moving optical scale mounted on said object;
    a light source for generating light for illuminating said optical scale;
    a birefringent element placed in an optical path of the light generated by said light source for receiving light emitted from said optical scale; and
    photosensing means for obtaining a plurality of output signals having a phase difference from light passing through said birefringent element, with the output signals having intensities which change in accordance with relative displacement of said optical scale with respect to the illuminating light.

13. An encoder, comprising:
    a first optical scale;
    a light source for generating light for illuminating said optical scale;
    a birefringent element placed in an optical path of the light generated by said light source for receiving light emitted from said first optical scale;
    a second optical scale for receiving the light emitted from said birefringent element to form fringes having different orientations of polarizations; and
    photosensing means for obtaining a plurality of output signals having a phase difference from light passing through said birefringent element, with the output signals having intensities which change in accordance with relative displacement of said moving optical scale with respect to the illuminating light.

14. An encoder according to claim 13, wherein said first optical scale is a moving optical scale.

15. An encoder according to claim 13, wherein said second optical scale is a fixed optical scale.

16. An encoder according to claim 13, wherein said first and second optical scales comprise a single optical scale having a cylindrical grating.

* * * * *

UNITED STATES PATENT AND TRADEMARK OFFICE
CERTIFICATE OF CORRECTION

PATENT NO. : 5,302,821
DATED : April 12, 1994
INVENTOR(S) : Igaki et al.

It is certified that error appears in the above-indentified patent and that said Letters Patent is hereby corrected as shown below:

COLUMN 4:

Line 26, "$D = Tx(n_e^2 - n_0^2)/(n_e^2 n_0^2)$" should read
--$D = Tx(n_e^2 - n_0^2)/(n_e^2 + n_0^2)$--.

COLUMN 6:

Line 57, "connector" should read --condenser--.

COLUMN 7:

Line 9, "orientation" should read --orientations--.
Line 54, "whereins" should read --wherein--.

Signed and Sealed this

Twenty-second Day of November, 1994

Attest:

BRUCE LEHMAN

Attesting Officer

Commissioner of Patents and Trademarks